Dec. 6, 1966 W. E. DU VALL 3,290,652

MAGNETIC-ENCODING SYSTEM

Filed June 13, 1962 3 Sheets-Sheet 1

INVENTOR.
WILBUR E. DUVALL
BY Lyon & Lyon
ATTORNEYS

INVENTOR.
WILBUR E. DU VALL
BY
Lyon & Lyon
ATTORNEYS

Dec. 6, 1966 W. E. DU VALL 3,290,652

MAGNETIC-ENCODING SYSTEM

Filed June 13, 1962 3 Sheets-Sheet 3

INVENTOR.
WILBUR E. DU VALL

BY Lyon & Lyon

ATTORNEYS 3,290,652

MAGNETIC-ENCODING SYSTEM

Wilbur E. Du Vall, Gardena, Calif., assignor, by mesne assignments, to The Electrada Corporation, Los Angeles, Calif., a corporation of Delaware Filed June 13, 1962, Ser. No. 202,151
3 Claims. (Cl. 340—147)

This invention relates to coding systems, and, more particularly, to a magnetic-encoding and/or decoding circuit.

One of the problems that arises in telemetry is that of finding the cheapest, simplest, and most reliable arrangement for inspecting the condition of a large number of circuits, for example, for encoding for transmission the identity of the circuit which is not operating properly, thereafter storing the identity of that circuit while continuing the inspecting operation.

An object of this invention is to provide an improved magnetic-core encoding and/or decoding system.

Another object of this invention is the provision of a novel magnetic-core circuit suitable for use where scanning and identification of an abnormal condition occurring in one or more of a large number of circuits being monitored is required.

Yet another object of the present invention is the provision of a unique and useful encoding and/or decoding circuit arrangement including magnetic cores suitable for utilization in telemetering.

These and other objects of this invention may be achieved in an arrangement wherein each circuit to be monitored is given a number in the decimal system. Assuming 100 circuits are desired to be monitored, then there are two sets of ten cores provided. The respective cores in the first set respectively represent the numbers 0 through 9, and the respective cores in the second set respectively represent the numbers 0, 10, 20, through 90. A circuit arrangement is provided comprising counting means, which, when actuated, can provide signals representative of successive counts in the decimal system.

A magnetic core of the type which is to be employed in this invention usually has toroidal shape and, preferably, has substantially rectangular hysteresis characteristics. Accordingly, it will have two states of magnetic remanence. One of the states, which shall be designated as the "one" state, is the state to which a core is driven by current applied to a winding coupled to that core when it is desired to write into that core. The other state of magnetic remanence, designated as the "zero" state, is the state to which the core is driven from the one state when current is applied to a winding on that core in the process of reading. If a core is in the zero state when a reading current is applied to the winding on the core, then substantially no voltage is induced by that core into a sense winding, which is a third winding inductively coupled to that core. If a core is in the one state and a reading drive occurs, then there is a voltage induced in the sense winding as the core is driven from its one to its zero state. The foregoing operation of magnetic cores is well known, but it is presented for the purposes of establishing the terminology to be used herein.

The two sets of magnetic cores are coupled to the counting means in a manner so that as the counting means is successively advanced through its count states, upon the proper enabling signal being provided, the count states are written into the magnetic cores. The actual circuit arrangement includes a clock-pulse source which provides clock pulses which first advance the counting means to its next count state, then write this count state into the magnetic-core sets, and then read these count states out of the magnetic-core sets.

A switch is provided for each circuit which is desired to be monitored. If the circuit being monitored is not operating properly, then the switch is opened. If the circuit is operating properly, then the switch is closed. When the cores which represent the number of the circuit with which a switch is associated are read, an output voltage is induced in the sensing winding coupled to these cores. If the switch of the associated circuit is closed, then the counting means proceeds to the next count. If the switch is opened, then, in response to the signal which has been read, a light is illuminated and a stop signal is generated. This stop signal momentarily stops the progression of the count of the counting means to enable a transmitter to read and transmit that count to a distant location. Thereafter, the counting means continues its count-sequencing operation. At the remote location, the count is received, decoded, and displayed.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
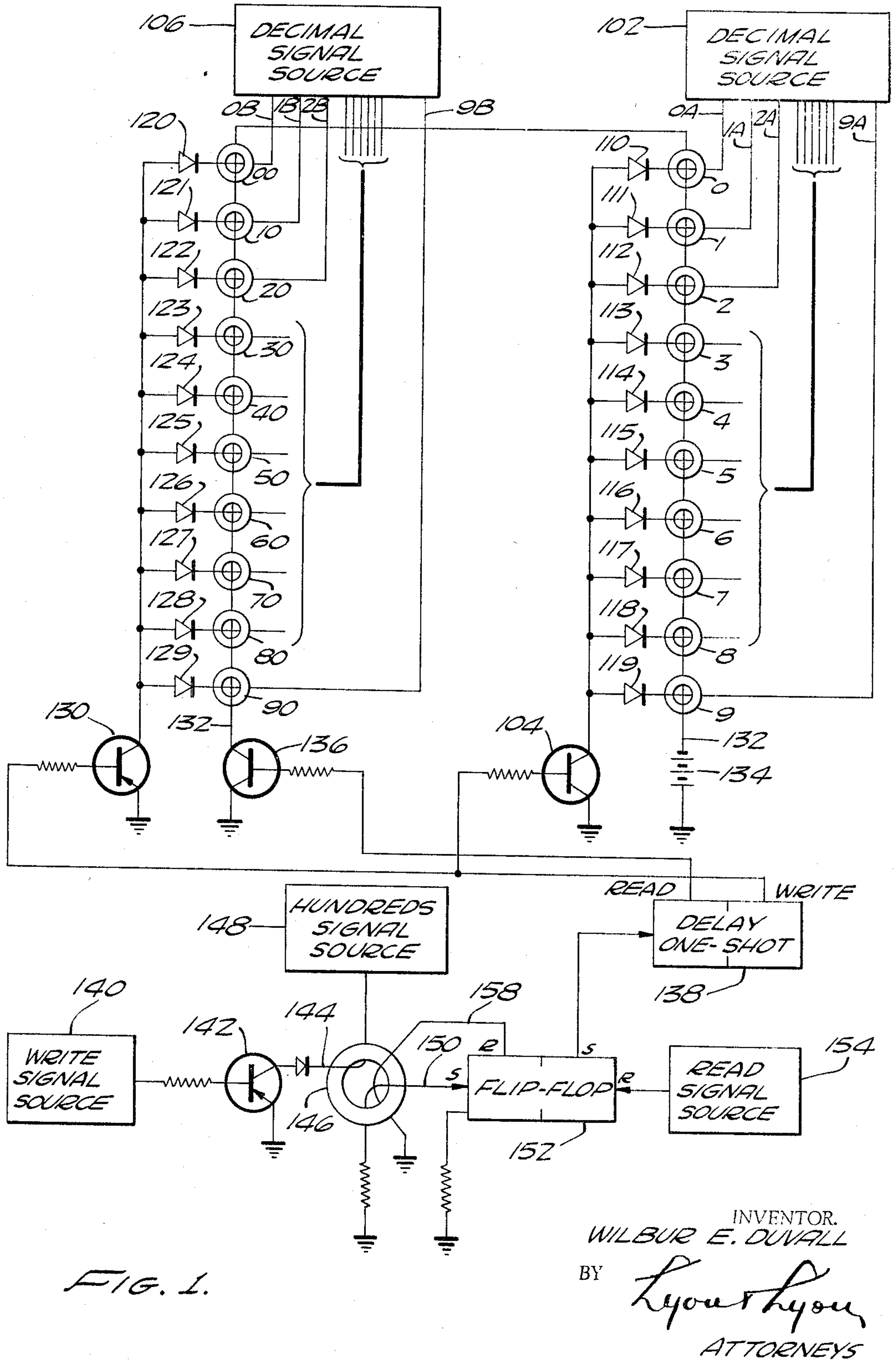
FIGURE 1 is a circuit diagram in accordance with this invention, wherein the sensing windings and sensing circuits are omitted in order to simplify the drawing.

Reference is now made to FIGURE 1, which is a circuit diagram of an embodiment of the invention, illustrating a magnetic-core array for encoding and monitoring 100 circuits. The sensing windings and sensing circuits, in accordance with this invention, are omitted from FIGURE 1 in the interests of preserving simplicity in the drawings. Also, not all of the writing windings are shown, in order to preserve simplicity in the drawing. However, sufficient of these windings is shown to enable anyone skilled in this art to reproduce this invention.

In accordance with this invention, a first set of cores, which may be called the unit set, comprises cores, respectively designated by the reference numerals 0 through 9. A second set of magnetic cores, respectively designated as the ten set, has cores respectively designated 00 through 90. A decimal-signal source 102 has ten output lines, a different one of which is respectively coupled to a different one of the cores 0 through 9. For example, the output line, designated as 0A, passes through the main aperture of the core 0 and then is connected to a diode 110. The other side of the diode is connected to a common bus, which is connected to the collector of a transistor 104. The output line 9A is inductively coupled to the magnetic core 9 and then is connected through a diode 119 to the common bus, which is connected to the collector of the transistor 104.

A second decimal-signal source 106 also has ten output lines, respectively designated as 0B through 9B. The output line 0B is inductively coupled to the core 00, and thereafter is connected through a diode 120, which is connected through a common bus to the collector of a transistor. Similarly, the output line 9B is inductively coupled to the core 90, and thereafter is connected through a diode 129 to the common bus, which is connected to the collector of transistor 130.

A reading winding 132 is inductively coupled to all the cores in the two sets of cores. One end of this reading winding is connected to a source of potential 134; the other end of this reading winding is connected to the collector of a transistor 136. The transistors 130 and 104 are normally nonconductive. They are enabled to conduct current upon receiving one output from a delay one-shot circuit 138, which is applied to the bases of both transistors simultaneously. When the transistors 130 and 104 are rendered conductive, then and only then current is enabled to flow from whichever one of the lines 0A through 9A or 0B through 9B which has potential applied thereto. Thus if, for example, line 0A had potential applied thereto, then, when transistor 104 is rendered conductive, the core 0 would be driven to its one state. Similarly, if, say, line 2B had potential applied thereto, then, when transistor 130 is rendered conductive, core 20 is driven to its one state.

A delay one-shot circuit, as is well known, is a circuit which has one state of stability and one state of instability. Upon the application of a signal to its input, it is driven from its stable to its unstable state, returning back to its stable state after an interval determined by the values of the circuit components of which the delay one-shot circuit is constructed. Thus, upon the application of a signal to the delay one-shot 138, it is driven to its unstable state, whereupon it can apply a write-output signal to the bases of the transistors 130 and 104. This renders them temporarily conductive. Upon the one-shot 138 returning to its stable state, a read-output signal is generated which is applied from the delay one-shot 138 to the base of the transistor 136. This renders transistor 136 temporarily conductive, whereupon current can flow therethrough from the source of potential 134. In doing this, the magnetic cores which have been driven to their one states are all returned to their zero states.

In accordance with this invention, in order to drive delay one-shot 138, a signal from a write-signal source 140 is applied to the base of a transistor 142, to render it conductive. A writing winding 144 is inductively coupled to a magnetic core 146. One end of the writing winding is connected to receive potential from a hundreds signal source 148. The other end of the writing winding 144 is connected to the collector of the transistor 142. Accordingly, upon energization from the write-signal source, transistor 142 is enabled to conduct current from the hundreds signal source 148, thereby driving the core 146 to its one state. When the core 146 is driven from its zero to its one state, a voltage is induced in a sensing winding 150 which is inductively coupled to the core 146.

The sensing winding is connected to a flip-flop 152 and drives the flip-flop from its reset to its set state. When flip-flop 152 is driven from its reset to its set state, it provides an output which can cause the delay one-shot 138 to be driven from its stable to its unstable state, whereupon writing can occur in the two sets of cores in accordance with the signals provided at the outputs of the two decimal-signal sources 102 and 106. Shortly after the occurrence of a signal from the write-signal source, a read-signal source 154 applies a signal to the flip-flop 152, to drive it to its reset state. In being driven to its reset state, flip-flop 152 can drive the core 146 back to its zero condition, since it is inductively coupled through a winding 158 to core 146 for this purpose.

In summarization of the foregoing, the two decimal-signal sources 102 and 106 can energize a different one of their output lines. However, no writing will occur in any of the cores unless the transistors 130 and 104 are energized. The write-signal source 140 drives a transistor 142, whereby a magnetic-core 146 is driven from its zero to its one state of magnetic remanence in the presence of a signal from the hundreds signal source 148. If this does occur, then the sensing winding 150 has a potential induced therein, whereby flip-flop 152 can be driven from its reset to its set state. When flip-flop 152 is driven to its set state, it can drive a delay one-shot 138 to its unstable state. This causes the transistors 130 and 104 to be rendered conductive. As a result, one of the cores in the sets which are connected to an energized line 0A through 9A or 0B through 9B are driven to their one state of magnetic remanence.

The delay one-shot 138 then returns to its stable state, at which time the transistor 136 is temporarily rendered conductive. This causes a current to be applied to the reading winding 132, whereby the magnetic cores which have been driven to the one states are returned to their zero states. The flip-flop 152 is then driven back to its reset state by a signal from the read-signal source 154. At this time, the magnetic core 146 is also driven to its zero state by the reset output-pulse signal from the flip-flop circuit 152.

Figure 2:
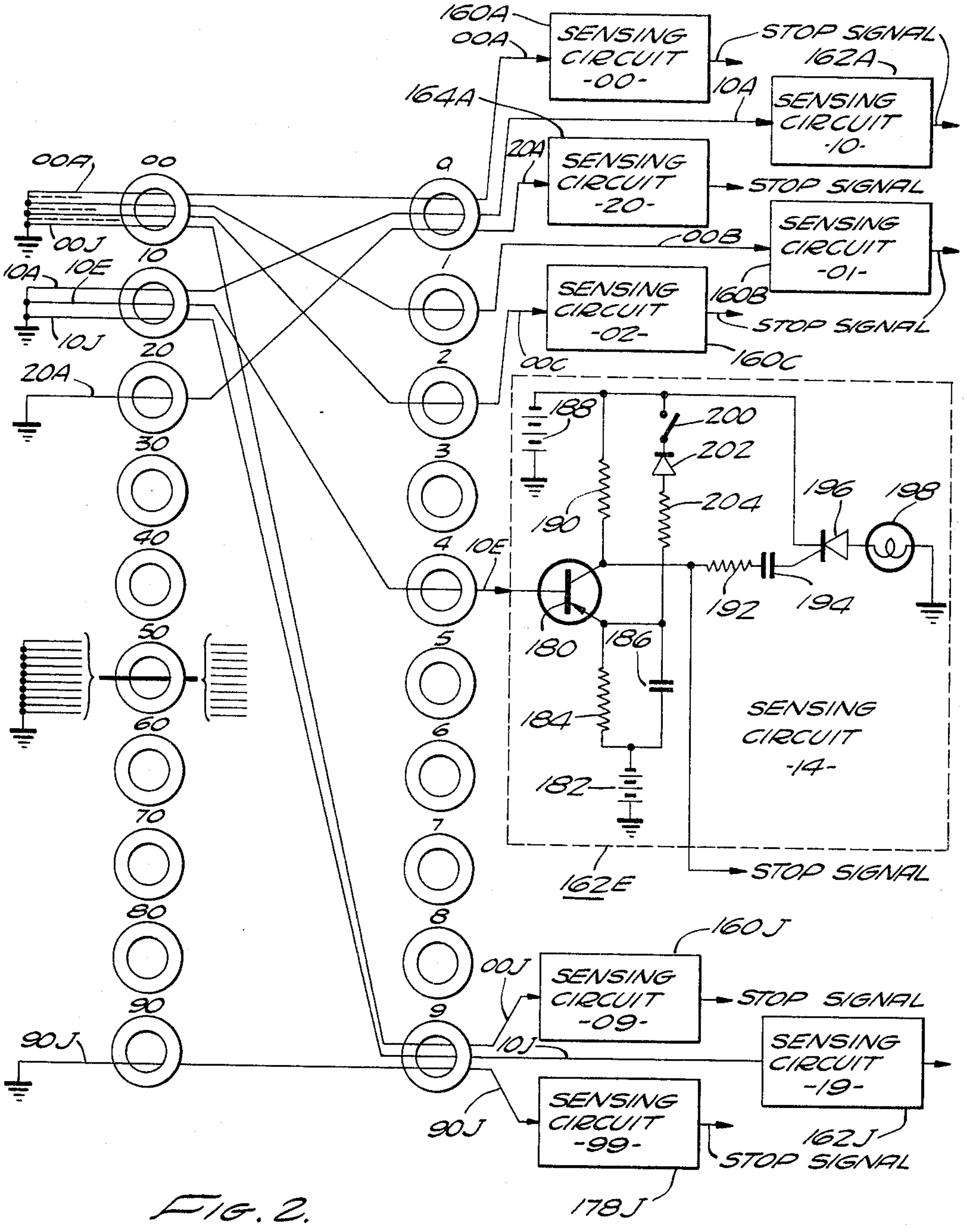
FIGURE 2 is a circuit diagram in accordance with this invention, illustrating the sensing windings for the magnetic cores as well as the sensing circuits.

Reference is now made to FIGURE 2, which shows an arrangement of magnetic cores 0 through 9 and 00 through 99, with their sensing windings and sensing circuits. In accordance with this invention, each sensing winding is inductively coupled to two cores, one of which is in the tens group and the other of which is in the units group. Each core in the higher-order group, here the tens group, has ten sensing windings inductively coupled thereto, each one of which thereafter is inductively coupled to a different one of the cores in the successively lower-order group, here the units group. Thus, by way of illustration, the core 00 has inductively coupled thereto sensing windings 00A through 00J, which thereafter are respectively coupled to the magnetic cores 0 through 9. One end of each of the sensing windings 00A through 00J is connected to ground; the other end of each of the sensing windings 00A through 00J is respectively connected to the sensing circuits, respectively 160A through 160J.

As a further illustration of the sensing-winding coupling scheme, sensing-winding 10A is inductively coupled to the core 10 and also to the core 0. One end of this sensing winding is grounded, and the other end is connected to a sensing circuit 162A. Sensing winding 10E is inductively coupled to the core 10 and also to the core 4. It has one end connected to ground and the other end connected to a sensing circuit 162E. Sensing winding 90J is inductively coupled to the core 90 and also to the core 9. It has one end connected to ground and the other end is connected to a sensing circuit 178J.

Each one of the sensing circuits is identical with the detailed circuit 162E, shown in FIGURE 2. This includes a transistor 180, to the base of which the end of a sensing winding is connected. The emitter of transistor 180 is connected to a bias source 182 through a resistor 184. A bypass capacitor 186 is connected across that resistor. The potential provided by the bias source 182 is sufficient to maintain transistor 180 nonconductive, except in the presence of the induced voltage from two cores which are driven to their zero states from their one states by the reading drive. Accordingly, the transistor 180 will only be rendered conductive when a voltage is induced in the sensing winding 10E from both cores 10 and 4, and not from either alone.

The collector of transistor 180 is connected to a source of operating potential 188 through a resistor 190. This resistor is the collector-load resistor. An output is taken from the collector of the transistor 180, which consists of a signal, designated as a stop signal, and also which is applied through a series-connected resistor 192 and capacitor 194 to the control electrode of a silicon-controlled rectifier 196. The cathode of this silicon-controlled rectifier is connected to the source of operating potential 188. The anode of the silicon-controlled rectifier is connected through a light 198 to ground. A switch 200 has one end connected to the source of operating potential 188; the other end is connected through a diode 202 and a resistor 204 to the emitter of the transistor 180.

In the presence of a signal on the sensing winding which has an amplitude sufficient to overcome the bias provided by the bias source 182, transistor 180 is rendered conductive. If the switch 200 is open at that time, then a pulse signal, designated as the stop signal, is derived from the collector of transistor 180, and the silicon-controlled rectifier 196 is rendered conductive, whereby the light 198 is illuminated. Should the switch 200 be closed at the time that the triggering signal arrives on the sensing winding 10E, then the transistor 180 will not respond thereto, since, effectively, the operating potential for the transistor is bypassed through the diode 202 and resistor 204. Accordingly, no stop signal will be provided and the silicon-controlled rectifier 196 will remain nonconductive, despite the presence of an energizing signal on the sensing winding 10E. The other sensing circuits operate in the identical manner, since they include the identical circuitry.

The light-and-stop signal from each one of the sensing circuits, when present, identifies the decimal number represented by the two cores which have provided the signal resulting in their energization. Accordingly, assuming it is desired to monitor the operability or condition of a plurality of circuits employing this invention, then the arrangement can include the following structures. Each one of the switches 200 may be associated with other apparatus in the circuit, such as a relay, whereby the switch is maintained closed as long as the circuit being monitored is operating properly, but is opened whenever the circuit is not operating properly. Circuit means may be provided to first write into the cores and then read from the cores, progressing in this manner through the cores in the sequence designated by their associated decimal number. A light is illuminated for each one of these circuits which is not operating properly, and a stop signal is provided which may be employed for any desired indicating purpose. Of course, it will be understood that this description is made in terms of monitoring a circuit, which is by way of exemplification of any other apparatus, such as pressures, temperatures, etc., which is desired to be monitored.

Figure 3:
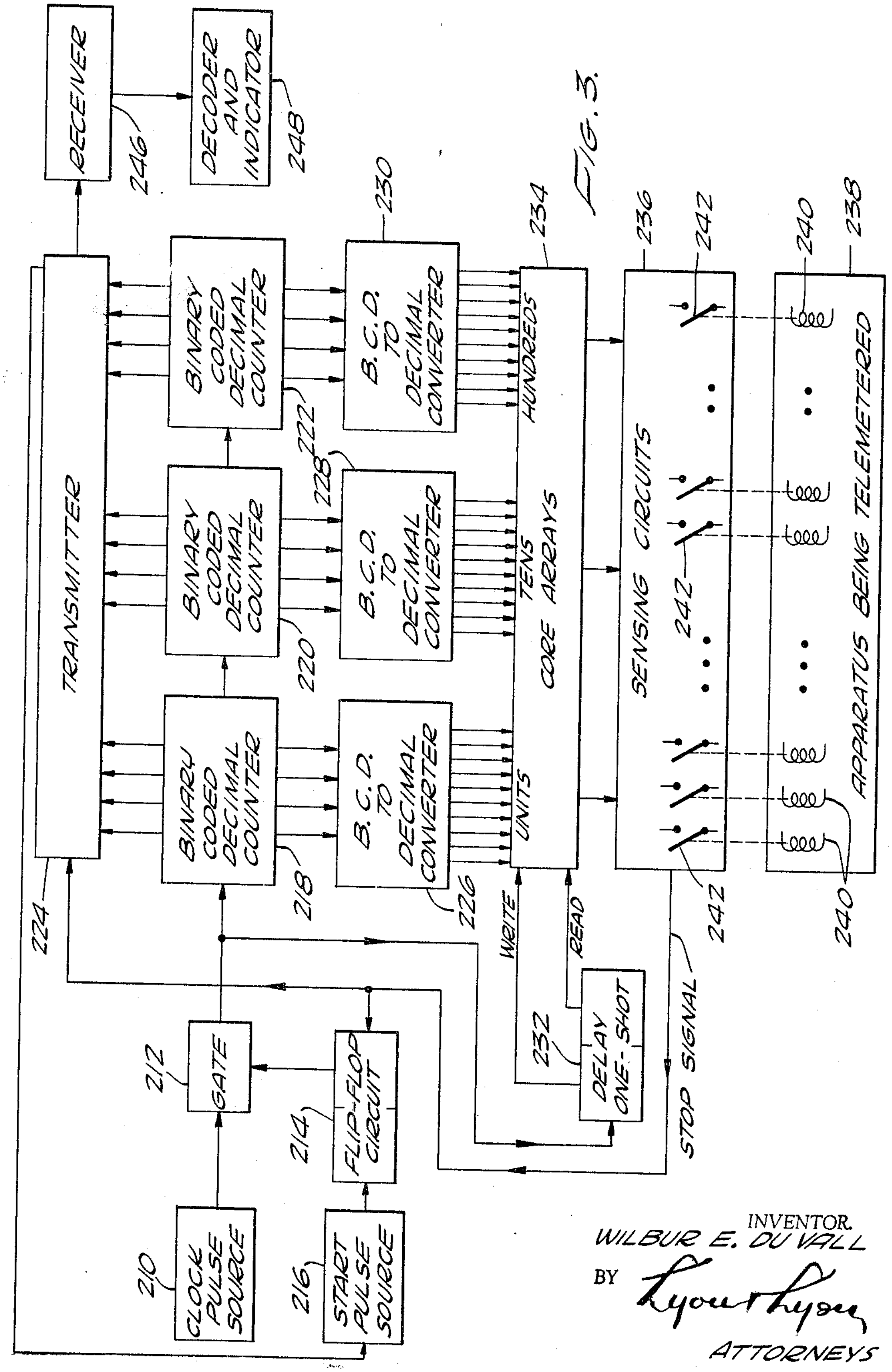
FIGURE 3 is a block diagram in accordance with this invention, illustrating how the magnetic-core coder circuits may be used.

FIGURE 3 is a block diagram illustrating how the embodiment of the invitation may be employed in an arrangement for generating code signals representing the circuits being monitored and transmitting these code signals wherever a monitored circuit is not operating properly.

A clock-pulse source 210 applies pulses to a gate 212, which will not pass these pulses unless an enabling signal is received from a flip-flop circiut 214. The flip-flop circuit is driven to the state wherein it provides the enabling signal from a start-pulse source 216. The flip-flop circuit is returned to the state at which it no longer provides the enabling signal by a stop signal. The output of a gate 212, when it is enabled, is applied to a binary-coded-decimal counter, consisting of three binary-coded-decimal decade stages, respectively 218, 220, and 222. The binary-coded-decimal decade stage 218 drives a binary-coded-decimal decade stage 220 with its output whenever it receives ten pulses. The binary-coded-decimal decade stage 220 drives the binary-coded-decimal stage 222 with its output whenever it receives ten pulses. Accordingly, the count state of the respective stages 222, 220, and 218, respectively represent hundreds, tens, and units.

Output is taken from the three binary-coded-decimal counter stages and is applied to a transmitter 224 and also to three binary-coded-decimal to decimal converters, respectively 226, 228, and 230. These respective converters convert the four-line output of the binary-coded-decimal counter stages to which they are connected to a ten-line output. That is, one of the ten lines constituting the output of each one of the converters, respectively 226, 228, and 230, will be energized, representing thereby the count in the decimal system of the binary-coded-decimal signals which are received from the respective binary-coded-decimal counters.

Referring now to FIGURE 1, it will be seen that the outputs from the respective binary-coded-decimal to decimal converters 226, 228, 230 comprise the requisite inputs represented by the respective signal sources 102, 106, and 148 for successively writing into the core arrays. A different circuit, in accordance with the combined FIGURES 1 and 2, is required for each 100 circuits desired to be monitored. Thus, since the three decade counters 218, 220, 222, shown in FIGURE 3, can count to 1,000, ten circuits of the type represented by FIGURE 1 and FIGURE 2 are required. The outputs from binary-coded-decimal to decimal converters 226 and 228 are respectively connected in parallel to each different one of the units and tens magnetic-core sections in each different core set. The magnetic core 146 serves the purpose of identifying which set of 100 cores is being written into or read from. Thus, each different output from binary-coded-decimal to decimal converter 230 is applied to a different magnetic core 146 of the ten which are required.

Referring back to FIGURE 3, it will be seen that when the gate 212 is enabled, its output is applied to a delay one-shot multivibrator 232. The first output of this delay one-shot multivibrator, upon receiving a clock-pulse signal, is a write signal, such as is represented by the output of the write-signal source 140 in FIGURE 1. The second output from the delay one-shot multivibrator 232 is a read signal, such as is represented by the output of the read-signal source 154 in FIGURE 1. The write signal from the delay one-shot multivibrator 232 enables the hundreds signal from the converter 230 to drive the core 146 in the one of the core arrays 234 which is connected to be driven by one of the outputs of the converter 230.

The sensing-circuit portion of the core arrays 234 is grouped in a rectangle, designated as sensing circuits 236. The apparatus being telemetered, represented by a rectangle 238, comprises a plurality of circuits, a different one of which is associated with a different decimal number, and therefore with a different pair of cores. There is provided for each circuit a different relay, including a solenoid 240 and a pair of contacts 242. Each contact pair corresponds to the switch 200 in the sensing circuit shown in FIGURE 2. The circuits, when operating properly, maintain the relay coil energized and the contact closed. If desired, the contact can be normally closed, so that when something goes wrong with the circuit being monitored, the relay coil is energized, and the contacts will be opened at that time.

The operation of the system shown in FIGURE 3 is as follows: A start pulse from the start-pulse source 216 is applied to the flip-flop circuit 214, in order to initiate a telemetering survey of the circuits being monitored. Flip-flop circuit 214 enables gate 212, whereby pulses from the clock-pulse source 210 can be applied to the binary-coded decimal counter. Clock pulses are also applied to the delay one-shot 232. The counter advances one count in response to a clock pulse, which count is decoded, or rather, converted from the binary-coded-decimal system to the decimal system. At this time, the delay one-shot 232 provides a write signal, which serves the function of selecting the one of the core arrays into which writing will occur of the decimal number corresponding to the binary-coded-decimal count.

Shortly thereafter, a reading pulse is applied which drives the cores which have been driven to their one states back to their zero states. If the contacts 242 of the circuit, having a decimal number corresponding to the count, are closed, then the next clock pulse from the source 210 advances the counter to the next count condition, whereupon the operation described is repeated. Should the contacts 242 be opened, indicating a condition for which an alarm is sought, then a stop signal is generated which is applied to the flip-flop circuit 214, to drive it to its reset state, and is also applied to the transmitter 224.

Gate 212 is closed. A light in the sensing circuits is turned on and remains illuminated, indicative of the number of the circuit in which there is trouble. The transmitter 224 is energized by the stop signal to read a binary-coded-decimal number represented by the count in the binary-coded-decimal counter, at which further counting is stopped. This number is then transmitted by the transmitter 224 to a receiver 246. The receiver is connected to a decoder and indicator 248, which decodes these signals and indicates at whatever location it is desired that there is trouble and the number of the particular circuit at which the trouble exists. Start pulses are generated by transmitter 224 when the code has been sent.

The next start pulse from the source 216 drives the flip-flop 214 to the state at which it will enable gate 212 to open, whereupon the counter continues to advance from the count state at which it was stopped. However, the light, which was illuminated when the sensing circuit detected a trouble, will remain illuminated, thus indicating the location of the trouble, despite the fact that the counter is advanced therefrom. The lights have manual or automatic reset circuits. Normally, a reset switch is placed in series with the light.

Transmitter 224 may be any arrangement for scanning the outputs of the binary-coded-decimal counter for transmitting the pulse pattern represented by this output. This may simply be an arrangement consisting of a gate for each output line from the binary-coded-decimal counter with a pulse source applying pulses successively to these gates, whereby those of the gates which are connected to outputs which are energized will produce an output, and those of the gates which are connected to outputs which are not energized will not produce an output. The receiver 246 may be any arrangement for receiving the transmitted code and staticizing it, as by register, for the purpose of decoding.

It should be interesting to note that the core-array arrangement, as shown in FIGURES 1 and 2, may also be employed for decoding these signals, since the staticized binary-coded-decimal signals need only be converted by any suitable binary-coded-decimal to decimal converter circuit to a strictly decimal signal, whereupon the decimal signal may be read into the core arrays. The sensing circuits need not have the shunting contacts 200. Accordingly, the decimal code will be indicated by an illuminated light 198 or by any other indicator which is energized by the signal output of the sensing circuit.

There has accordingly been described hereinabove a novel and useful magnetic-core circuit arrangement wherein plural-line signals having numerical significance are converted into a single-line indication representative of the number represented by the plural energized line signals. The system not only decodes the signals applied thereto, but may also be used for generating a code representative of or identifying one out of many lines in which a condition to be indicated exists.

I claim:

1. A coder-decoder circuit arrangement comprising a first plurality of magnetic cores, a second plurality of magnetic cores, each of the magnetic cores in said first and second plurality having two states of magnetic remanence respectively designated as the one and zero state and being drivable from one to the other upon the application of magnetomotive forces thereto, each of the magnetic cores in said first plurality of cores being representative of a different numerical digit of a second order, each of the magnetic cores in said second plurality of cores being representative of a different numerical digit of a first order, a plurality of groups of sensing windings, the number of groups of sensing windings in said plurality being equal to the number of cores in said first plurality of cores, the number of sensing windings in a group of sensing windings being equal to the number of cores in said second plurality of cores, each said group of sensing windings being inductively coupled to a single core in said first plurality of cores, each sensing winding in a group of sensing windings being inductively coupled to a different one of the cores in said second plurality of cores, a different sensing circuit connected to a different one of the sensing windings, means for applying a writing drive to successive cores in said first and second pluralities of cores to drive one core in each said plurality to its one state, means for applying a reading drive to all the cores after a writing drive to drive them to their zero state whereby a voltage is induced in the sensing lines coupled to those of the magnetic cores which respond to said reading drive, and means in each of said sensing circuits for providing at particular times an indication whenever a sensing winding connected thereto is inductively coupled to two cores which are driven simultaneously from their one to their zero states of magnetic remanence.

2. A circuit as recited in claim 1 wherein each said sensing circuit includes a transistor having a collector, base, and emitter electrode, means for connecting a sensing winding to the base of said transistor, means for applying operating potential to said transistor, means for applying a bias to said transistor to maintain it nonconductive except in the presence of signal on said sensing winding due to two magnetic cores being driven from their one to their zero states, means coupled to said transistor to provide an indication when said transistor is rendered conductive, and switch means connected to said transistor for maintaining said transistor inoperative when said switch means is closed.

3. A magnetic coding-decoding circuit comprising a first group of ten cores, a second group of ten cores, and a third core, each core in said first group being representative of a different decade number between 00 an 90, each core in said second group being representative of a different unit number between 0 and 9, a plurality of sensing windings, each sensing winding being representative of a different number from 0 to 99, each said sensing winding being inductively coupled to a core in the first group and to a core in the second group which are representative of numbers whose total equals the number with which the sensing winding is associated, digital input means for applying signals to the cores in said first and second plurality of cores to sequentially drive the cores in their numbered sequence from their zero to their one states, said means for driving including a separate drive winding inductively coupled to a different one of said cores, means for applying signals to one end of each of said separate drive windings, a normally open switch means, means connecting the other end of each of said separate drive windings to said normally open switch means, means for driving said third core from its zero to its one state, means for driving said third core from its one to its zero state, and means responsive to said third core being driven from its one to its zero state for closing said normally open switch means to enable writing into said first and second plurality of cores, means operative immediately subsequent to a core in said first plurality and a core in said second plurality of cores being driven to their one states to drive said cores back to their zero states, a plurality of sensing circuits a different one of which is connected to a different one of said sensing windings, and means for biasing a different one of said sensing circuits to prevent it from responding to a signal on the sensing winding to which the sensing circuit is connected which has an amplitude less than the one which occurs when the two cores to which the sensing circuit is coupled are driven from their one to their zero states.

References Cited by the Examiner

UNITED STATES PATENTS

| | | | |
|---|---|---|---|
| 2,657,272 | 10/1953 | Dimond | 340—347 |
| 2,960,682 | 11/1960 | French | 340—347 |
| 3,045,210 | 7/1962 | Langley | 340—150 |
| 3,045,228 | 7/1962 | Bullock | 340—347 |
| 3,087,149 | 4/1963 | Malcom | 340—347 |
| 3,088,098 | 4/1963 | Moore | 340—150 |

NEIL C. READ, *Primary Examiner.*

A. J. KASPER, *Assistant Examiner.*